(12) United States Patent
Huang et al.

(10) Patent No.: US 11,733,084 B2
(45) Date of Patent: Aug. 22, 2023

(54) HIGH-PRECISION WEIGHING MODULE WITH REDUCED THERMAL GRADIENT

(71) Applicants: Mettler-Toledo (Changzhou) Precision Instruments Ltd, Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Dandan Huang, Changzhou (CN); Xiang Li, Changzhou (CN); Ping Zhang, Changzhou (CN); JinJie Cai, Changzhou (CN)

(73) Assignees: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 191 days.

(21) Appl. No.: 17/302,655

(22) Filed: May 10, 2021

(65) Prior Publication Data
US 2021/0348963 A1 Nov. 11, 2021

(30) Foreign Application Priority Data
May 11, 2020 (CN) .......................... 202010393055.9

(51) Int. Cl.
*G01G 7/02* (2006.01)
*G01G 21/02* (2006.01)
(Continued)

(52) U.S. Cl.
CPC ............... *G01G 7/02* (2013.01); *G01G 21/02* (2013.01); *G01G 21/22* (2013.01); *G01G 21/286* (2013.01); *G01G 23/00* (2013.01)

(58) Field of Classification Search
CPC .. G01G 21/28–286; G01G 7/02; G01G 21/02; G01G 21/22; G01G 23/00
See application file for complete search history.

(56) References Cited

U.S. PATENT DOCUMENTS

| | | |
|---|---|---|
| 4,401,176 A | 8/1983 | Knothe et al. |
| 10,018,499 B2 | 7/2018 | Zhao |
| 2017/0122797 A1* | 5/2017 | Bhler .................. F25B 21/02 |

\* cited by examiner

*Primary Examiner* — Randy W Gibson
(74) *Attorney, Agent, or Firm* — Standley Law Group LLP; Jeffrey S. Standley; Adam J. Smith (57) ABSTRACT

An integrated high-precision weighing module has a shell, an electromagnetic force sensor, a printed circuit board (PCB), a weighing pan component, a support ring, and an air baffle ring. The electromagnetic force sensor and the PCB are mounted in the shell. A bearing head of the electromagnetic force sensor extends upward from an upper end portion of the shell. The support ring sheathes the bearing head. The weighing pan component is mounted on the bearing head, with the support ring located between the weighing pan component and the shell. The air baffle ring is disposed around the weighing pan component and located on the support ring. A first airflow channel is formed among the shell, the support ring, and the air baffle ring. At least part of airflow in the shell flows to the outside through the first airflow channel.

10 Claims, 5 Drawing Sheets

(51) Int. Cl.
*G01G 21/22* (2006.01)
*G01G 21/28* (2006.01)
*G01G 23/00* (2006.01)

HIGH-PRECISION WEIGHING MODULE WITH REDUCED THERMAL GRADIENT

CROSS-REFERENCE TO RELATED APPLICATIONS

This application makes a claim of priority to Chinese application CN 202010393055.9, filed on 11 May 2020, which is incorporated by reference as if fully recited herein.

TECHNICAL FIELD

The present invention relates to the field of high-precision industrial weighing apparatuses, and in particular to an integrated high-precision weighing module.

BACKGROUND ART

In the field of high-precision industrial weighing apparatuses, high-precision modules are highly susceptible to environmental influences. For example, the temperature and humidity of the environment, the thermal convection and air pressure in air, etc. all affect the precision of weighing, so for commercially available high-precision modules, the electronic unit is externally placed to reduce heat conduction and electromagnetic interference, resulting in inconveniences such as a large number of parts and complicated installation.

In the prior art, high-precision modules are known to have several problems.

The first problem is a problem of temperature gradient. For the entire module, most heat comes from a circuit board. At present, in commercially available products, the circuit board is externally placed in an independent electrical box to avoid the conduction and radiation of heat to a sensor. Such structure leads to problems such as a complicated structure and a large number of parts.

Next, heat exchange between the inside and outside of a housing is also a critical technical difficulty. Thermal convection often greatly affects a high-precision module. When a module is powered on, an electronic component and a sensor generate heat, causing certain air flow generated in a cavity of the module, and at this time, the air needs to be dispersed outside through a hole to reach balance in the cavity of the module. However, such dispersion process causes disturbance to a weighing pan.

In view of this, those skilled in the art would have improved the structure of high-precision weighing modules to overcome the foregoing technical problems.

SUMMARY

A technical problem to be resolved by the present invention is to provide an integrated high-precision weighing module to overcome deficiencies such as a complex structure and big influence of thermal convection of a high-precision weighing module in the prior art.

The present invention solves the above technical problem through the following technical solution:

An integrated high-precision weighing module is provided, wherein the integrated high-precision weighing module comprises a shell, an electromagnetic force sensor, a printed circuit board (PCB), a weighing pan component, a support ring, and an air baffle ring, the electromagnetic force sensor and the PCB are mounted in the shell, and a bearing head of the electromagnetic force sensor extends upward from an upper end portion of the shell;

the support ring is sheathed over the bearing head, the weighing pan component is mounted on the bearing head, such that the support ring is located between the weighing pan component and the shell, and the air baffle ring is disposed around the weighing pan component and located on the support ring; and a first airflow channel is formed among the shell, the support ring, and the air baffle ring, and when the integrated high-precision weighing module is powered on, at least part of airflow in the shell flows to the outside through the first airflow channel.

According to an embodiment of the present invention, the weighing pan component comprises a weighing pan and a weighing pan support, the weighing pan support is mounted on the bearing head, and the weighing pan is mounted on the weighing pan support.

According to an embodiment of the present invention, the shell comprises a bottom plate and a housing, the electromagnetic force sensor and the PCB are mounted on the bottom plate, and the housing covers the exterior of the electromagnetic force sensor and the PCB and is connected to the bottom plate; and an upper end surface of the housing is provided with a through hole, and the bearing head extends out through the through hole.

According to an embodiment of the present invention, the support ring comprises a mounting portion and a support plate, the mounting portion is disposed on the support plate, and the support ring is sheathed over the bearing head by the mounting portion and is in clearance-fit with the bearing head;

the support plate is provided with a plurality of air channel holes, the air channel holes surround the mounting portion, a protrusion extending upward is arranged in a circle at the periphery of the air channel holes, such that a flow channel is formed between the protrusion and the mounting portion, and the air channel holes are in communication with the through hole; and a lower portion of the air baffle ring is in clearance-fit with an upper portion of the support ring to form a first gap channel, and the first airflow channel is formed by the flow channel being in communication with the first gap channel.

According to an embodiment of the present invention, the air channel hole is a slotted hole.

According to an embodiment of the present invention, the mounting portion comprises a first mounting portion and a second mounting portion, the first mounting portion extends upward along the support plate, the second mounting portion extends downward along the support plate, the first mounting portion is located outside the housing, the second mounting portion is located inside the housing, and an outer diameter of the first mounting portion is greater than an outer diameter of the second mounting portion.

According to an embodiment of the present invention, a second gap channel is formed between the mounting portion and the bearing head; and the air baffle ring is sheathed over the first mounting portion, a third gap channel is formed between the air baffle ring and the weighing pan component, and the second gap channel is in communication with the third gap channel to form a second airflow channel.

According to an embodiment of the present invention, the air baffle ring comprises one outer cylindrical ring and one inner cylindrical ring which are concentrically arranged, the inner cylindrical ring and the outer cylindrical ring are connected by an annular plate, such that an upper cavity and a lower cavity are formed between the inner cylindrical ring and the outer cylindrical ring, and the first gap channel is located in the lower cavity.

According to an embodiment of the present invention, an outer end portion of the weighing pan is at least partially located in the upper cavity.

According to an embodiment of the present invention, the outer cylindrical ring is provided with a plurality of anti-overflow protection holes, and the anti-overflow protection holes are located at the lower cavity.

According to an embodiment of the present invention, the bottom plate is provided with a heat-insulation plate, and the heat-insulation plate isolates the electromagnetic force sensor and the PCB in two independent spaces.

Several positive improvement effects follow from this invention.

For the integrated high-precision weighing module as disclosed, an electronic unit is internally placed. In such a novel compact design, an electromagnetic force compensation technology is used and high-precision weighing performance is achieved, thereby facilitating the mounting and maintenance of a client. In such a structure, the electronic unit is internally placed, spatial restrictions and complex cables caused when an electrical box needs to be externally connected during on-site mounting by a client can be greatly reduced, and measuring performance with a precision of 0.01 mg can be ensured. The present invention has a compact structure in appearance and is suitable for most challenging application environments, such that a small space is required.

In addition, in the integrated high-precision weighing module, a heat-insulation plate isolates an electronic component and a critical part sensor in two independent spaces, and the material of the heat-insulation plate is electrically conductive polyoxymethylene (POM) and has a large thermal resistance coefficient. In this way, heat transfer in electronic components can be reduced more significantly, such that a temperature gradient around a sensor can be greatly reduced, thereby ensuring measuring performance.

BRIEF DESCRIPTION OF THE DRAWINGS

The above and other features, properties and advantages of the present invention will become clearer based on the description below in conjunction with the drawings and embodiments. In the figures, identical reference numerals identify identical parts and.

DETAILED DESCRIPTION OF EMBODIMENTS

To make the above objectives, features, and advantages of the present invention more apparent and easier to understand, specific implementations of the present invention will be described in detail below in conjunction with the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the figures denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the present invention must be understood, not simply by the actual terms used but also by the meanings encompassed by each term.

Figure 1:
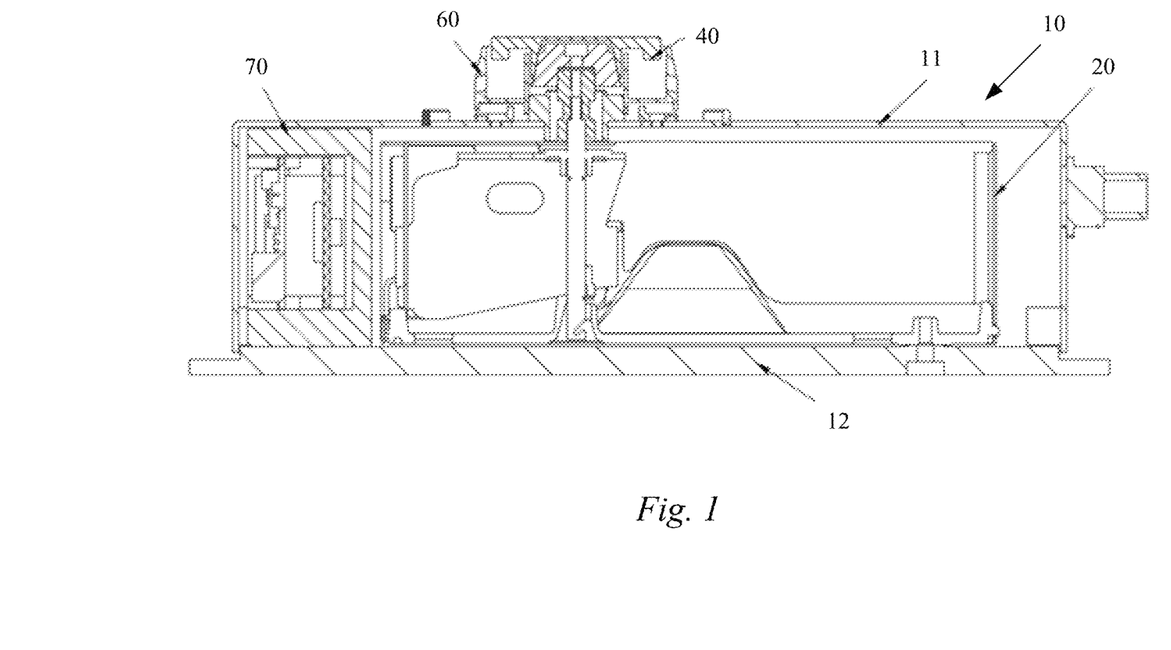
FIG. 1 is a schematic structural diagram of an integrated high-precision weighing module.
Figure 2:
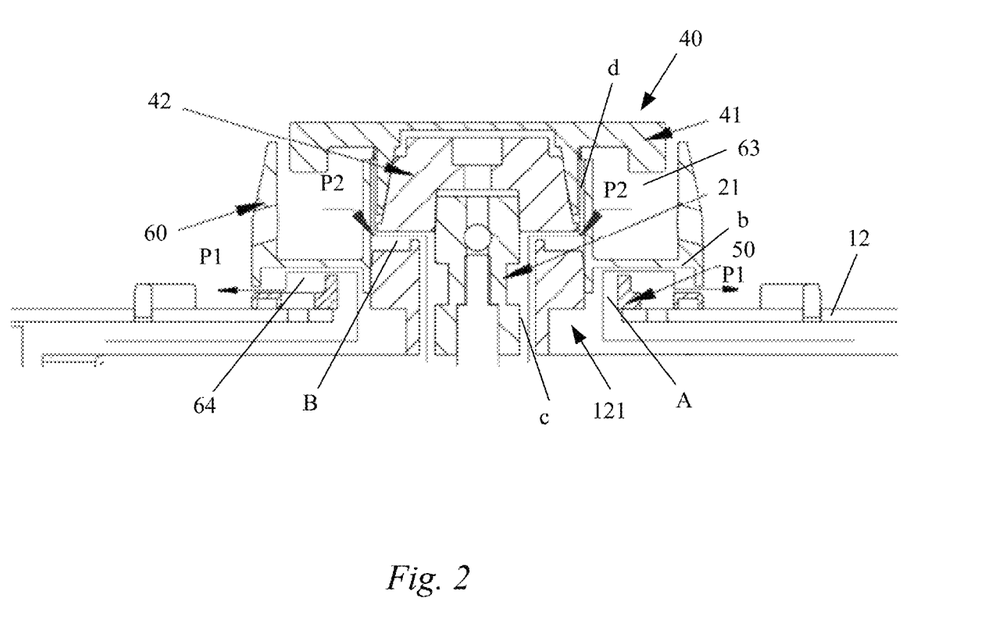
FIG. 2 is a schematic enlarged view of part E in FIG. 1.
Figure 3:
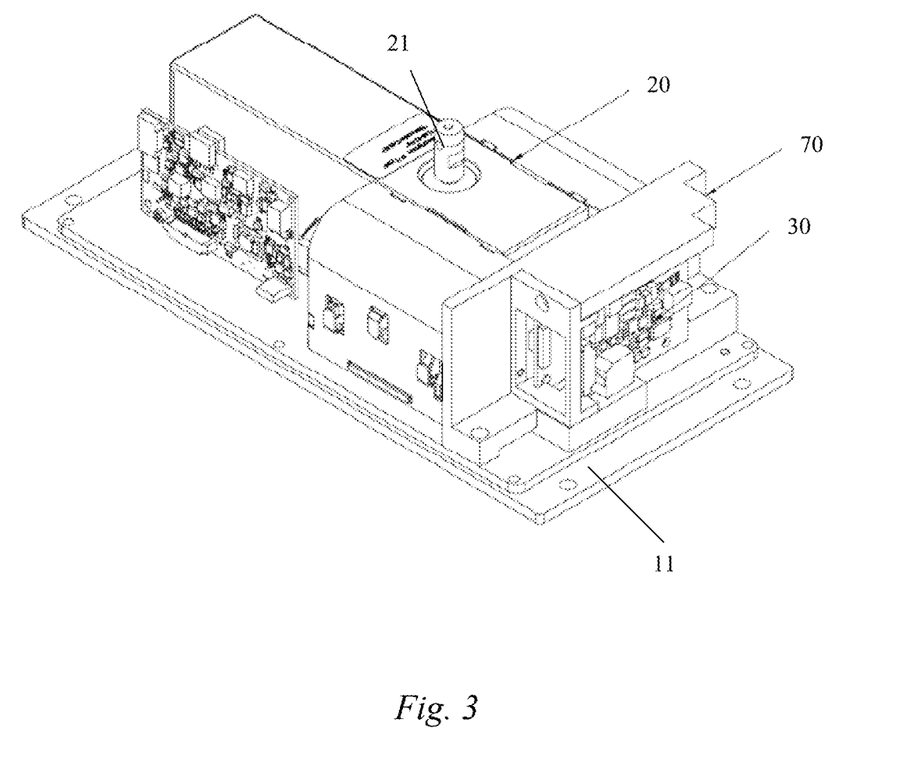
FIG. 3 is a perspective view of an integrated high-precision weighing module with a housing removed.

FIG. 1 is a schematic structural diagram of an integrated high-precision weighing module according to the present invention. FIG. 2 is a schematic enlarged view of part E in FIG. 1. FIG. 3 is a perspective view of an integrated high-precision weighing module according to the present invention with a housing removed.

As shown in FIG. 1 to FIG. 3, the integrated high-precision weighing module is a high-precision module with an internally placed electronic unit and has a maximum load of 200 g and a precision up to 0.01 mg. For such high-precision sensors and modules, a temperature gradient, thermal convection, and thermal radiation significantly affect the precision of measuring. Therefore, to reduce a temperature gradient around a sensor, fast heat exchange is the key in the present invention.

The present invention discloses an integrated high-precision weighing module, comprising a shell 10, an electromagnetic force sensor 20, a PCB 30, a weighing pan component 40, a support ring 50, and an air baffle ring 60. The electromagnetic force sensor 20 and the PCB 30 are mounted in the shell 10, and a bearing head 21 of the electromagnetic force sensor 20 extends upward from an upper end portion of the shell 10. The support ring 50 is sheathed over the bearing head 21. The weighing pan component 40 is mounted on the bearing head 21, such that the support ring 50 is located between the weighing pan component 40 and the shell 10. The air baffle ring 60 is disposed around the weighing pan component 40 and is located on the support ring 50. A first airflow channel A is formed among the shell 10, the support ring 50, and the air baffle ring 60. When the integrated high-precision weighing module is powered on, at least partial airflow in the shell 10 flows to the outside through the first airflow channel A.

Preferably, the weighing pan component 40 comprises a weighing pan 41 and a weighing pan support 42, the weighing pan support 42 is mounted on the bearing head 21, and the weighing pan 41 is mounted on the weighing pan support 42.

Herein, the shell 10 preferably comprises a bottom plate 11 and a housing 12, the electromagnetic force sensor 20 and the PCB 30 are mounted on the bottom plate 11, and the housing 12 covers the exterior of the electromagnetic force sensor 20 and the PCB 30 and is connected to the bottom plate 11. Herein, both the housing 12 and the bottom plate 11 are preferably made of a stainless steel material. In addition, an upper end surface of the housing 12 is provided with a through hole 121, and the bearing head 21 extends out through the through hole 121.

Figure 4:
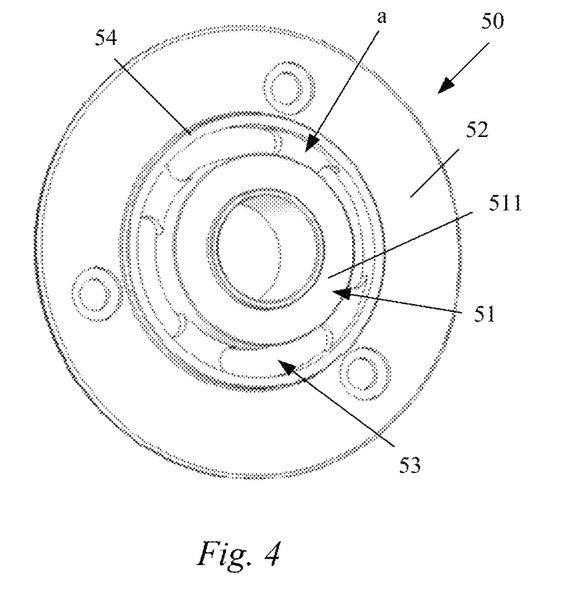
FIG. 4 is schematic structural diagram I of a support ring in an integrated high-precision weighing module.
Figure 5:
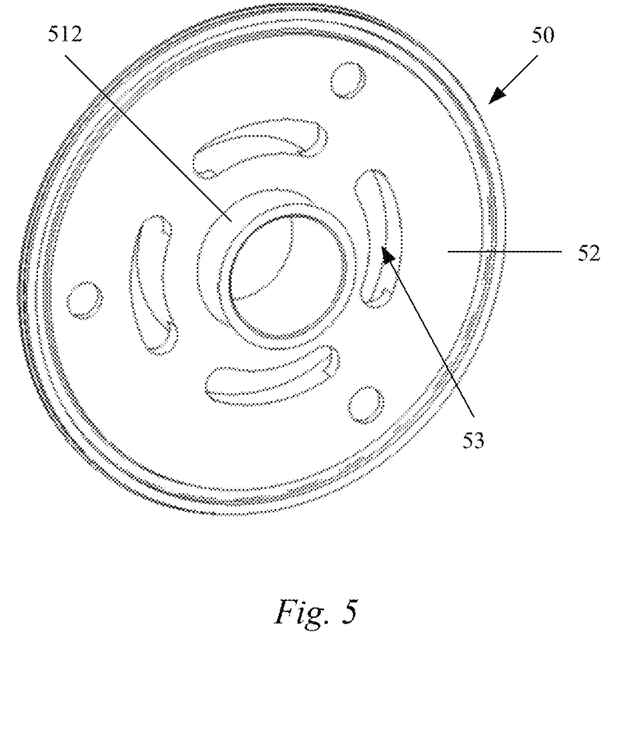
FIG. 5 is a schematic structural diagram II of a support ring in an integrated high-precision weighing module.
Figure 6:
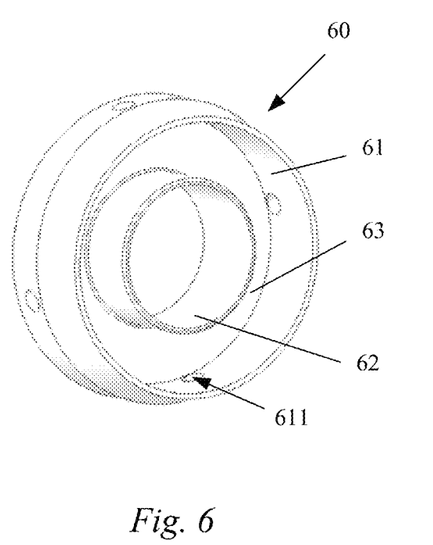
FIG. 6 is a schematic structural diagram I of an air baffle ring in an integrated high-precision weighing module.
Figure 7:
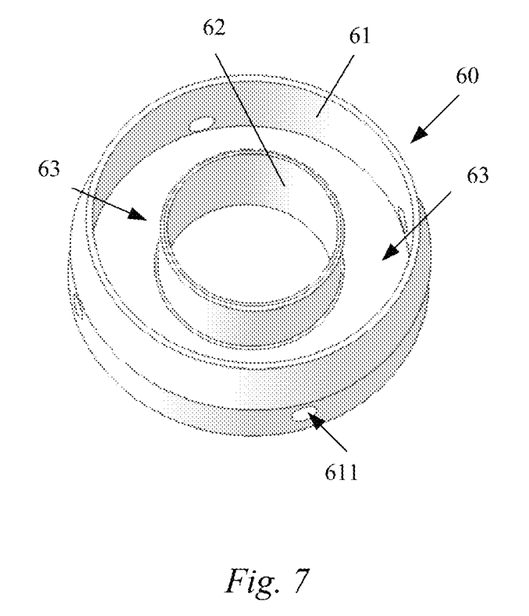
FIG. 7 is a schematic structural diagram II of an air baffle ring in an integrated high-precision weighing module.

FIG. 4 is schematic structural diagram I of a support ring in an integrated high-precision weighing module according to the present invention. FIG. 5 is schematic structural diagram II of a support ring in an integrated high-precision weighing module according to the present invention. FIG. 6 is schematic structural diagram I of an air baffle ring in an integrated high-precision weighing module according to the present invention. FIG. 7 is schematic structural diagram II of an air baffle ring in an integrated high-precision weighing module according to the present invention.

As shown in FIG. 4 to FIG. 7, in an embodiment of the present invention, the support ring 50 comprises a mounting portion 51 and a support plate 52, the mounting portion 51 is disposed on the support plate 52, and the support ring 50 is sheathed over the bearing head 21 by the mounting portion 51 and is in clearance-fit with the bearing head 21. The support plate 52 is provided with a plurality of air channel holes 53. The air channel holes 53 surround the mounting portion 51. A protrusion 54 extending upward is arranged in a circle at the periphery of the air channel holes 53, such that a flow channel a is formed between the protrusion 54 and the mounting portion 51. The air channel holes 53 are in communication with the through hole 121. A lower portion of the air baffle ring 60 is in clearance-fit with an upper portion of the support ring 50 to form a first gap channel b. The first airflow channel A is formed by the flow channel a being in communication with the first gap channel b. Herein, the air channel hole 53 is preferably a slotted hole.

Preferably, the mounting portion 51 comprises a first mounting portion 511 and a second mounting portion 512, the first mounting portion 511 extends upward along the support plate 52, the second mounting portion 512 extends downward along the support plate 52, the first mounting portion 511 is located outside the housing 12, the second mounting portion 512 is located inside the housing 12, and an outer diameter of the first mounting portion 511 is greater than an outer diameter of the second mounting portion 512.

Further, a second gap channel c is formed between the mounting portion 51 and the bearing head 21, the air baffle ring 60 is sheathed over the first mounting portion 511, a third gap channel d is formed between the air baffle ring 60 and the weighing pan component 40, and the second gap channel c is in communication with the third gap channel d to form a second airflow channel B.

Still further, the air baffle ring 60 preferably comprises one outer cylindrical ring 61 and one inner cylindrical ring 62 which are concentrically arranged. The inner cylindrical ring 62 and the outer cylindrical ring 61 are connected by an annular plate 63, such that an upper cavity 64 and a lower cavity 65 are formed between the inner cylindrical ring 62 and the outer cylindrical ring 61, and the first gap channel b is located in the lower cavity 65. An outer end portion of the weighing pan 41 is at least partially located in the upper cavity 64.

In addition, the outer cylindrical ring 61 is further provided with a plurality of anti-overflow protection holes 611. The anti-overflow protection holes 611 are located at the lower cavity 65.

In addition, another special point of the integrated high-precision weighing module in the present invention is that the bottom plate 11 is further provided with a heat-insulation plate 70. The heat-insulation plate 70 isolates the electromagnetic force sensor 20 and the PCB 30 in two independent spaces.

Specifically, in this embodiment, the electromagnetic force sensor 20 is preferably mounted on the bottom plate 11, and the PCB 30 is then mounted on the heat-insulation plate 70. The heat-insulation plate 70 is used to isolate an electronic component and a critical part sensor in two independent spaces. Herein, the material of the heat-insulation plate 70 is preferably electrically conductive POM and has a large thermal resistance coefficient. Heat transfer in electronic components can be significantly reduced, such that a temperature gradient around a sensor can be greatly reduced, thereby ensuring measuring performance.

According to the foregoing structural description, with reference to FIG. 2, an arrow P1 represents that when the module is powered on, an electronic component and a sensor generate heat, causing certain air flow in a cavity of the module. A large amount of heat is exchanged with the outside along the arrow P1 through the slotted holes in the support ring shown in FIG. 2, and a small part of heat is exchanged with the outside along an arrow P2, thereby reducing the interference of airflow on a weighing pan.

Further specifically, for a high-precision module, the first problem to be resolved is the temperature gradient. For the entire module, most heat comes from a circuit board. At present, in commercially available products, a circuit board is externally placed in an independent electrical box to avoid the conduction and radiation of heat to a sensor. Therefore, in the integrated high-precision weighing module of the present invention, electrically conductive POM (that is, a heat-insulation plate) is introduced between the circuit board and the sensor. For the material property of POM, the thermal conduction coefficient is small, such that heat from the circuit board can be effectively prevented from getting near the sensor, such that a temperature gradient around the sensor is reduced, and electrically conductive POM can also have effective anti-electromagnetic interference. Both a housing and a bottom plate are preferably made of a stainless steel material. In this way, heat exchange between an external environment and a sensor can be reduced. In addition, the flatness of the bottom of a sensor is ensured.

Next, heat exchange between the interior and exterior of a housing is also critical. In the integrated high-precision weighing module of the present invention, a maze-type weighing pan structure is designed, such that heat in the housing can be exchanged with external air. In addition, a weighing pan cannot be directly affected. If airflow directly goes toward the weighing pan, the precision of weighing is affected.

In addition, a temperature gradient around a sensor is reduced to implement fast heat exchange is also the key to the integrated high-precision weighing module of the present invention. In the integrated high-precision weighing module, an electronic unit and a sensor are both placed in the same housing. With the design of a heat-insulation plate in the middle, a temperature gradient is reduced. In this way, measuring is insusceptible to temperature. Certainly, the foregoing heat-insulation plate is only used to describe an example of the present invention. Such a heat-insulation plate also has many similar variations and replacements to the material and form. Therefore, any used similar material or structural variation provided that a heat insulation method is provided for the core problem of the present invention shall fall within the protection scope of this application.

In addition, thermal convection also greatly affects a high-precision module. An electronic component and a sensor generate heat as soon as the module is powered on, causing certain air flow in a cavity of the module. In this case, air needs to be dispersed to the air through a hole to reach balance in the cavity of the module. However, such a dispersion process causes disturbance to a weighing pan. Therefore, the support ring in the integrated high-precision weighing module of the present invention is provided with a plurality of air channel holes, for example, slotted holes, to enable a large amount of air to flow through the slotted holes to implement direct exchange with the external air instead of directly flowing to the weighing pan, thereby reducing the interference with the weighing pan. Only a small part of hot air flows through a gap between a bearing head and an air baffle ring. In this way, the influence of hot airflow on the weighing pan can be greatly reduced.

In conclusion, for the integrated high-precision weighing module of the present invention, in the present invention, an electronic unit is internally placed. In such a novel compact design, an electromagnetic force compensation technology is used and high-precision weighing performance is achieved, thereby facilitating the mounting and maintenance of a client. In such a structure, the electronic unit is internally placed, spatial restrictions and complex cables caused when an electrical box needs to be externally connected during on-site mounting by a client can be greatly reduced, and measuring performance with a precision of 0.01 mg can be ensured. The present invention has a compact structure in appearance and is suitable for most challenging application environments, such that a small space is required.

In addition, in the integrated high-precision weighing module, a heat-insulation plate isolates an electronic component and a critical part sensor in two independent spaces, and the material of the heat-insulation plate is electrically conductive polyoxymethylene (POM) and has a large thermal resistance coefficient. In this way, heat transfer in electronic components can be reduced more significantly, such that a temperature gradient around a sensor can be greatly reduced, thereby ensuring measuring performance.

Although specific embodiments of the present invention have been described above, those skilled in the art should understand that these are merely examples, and the scope of protection of the present invention is defined by the appended claims. Various alterations or modifications to these implementations can be made by those skilled in the art without departing from the principle and essence of the present invention; however, these alterations and modifications all fall within the scope of protection of the present invention.

REFERENCE NUMERALS

Shell 10
Electromagnetic force sensor 20
PCB 30
Weighing pan component 40
Support ring 50
Air baffle ring 60
Bearing head 21
First airflow channel A
Weighing pan 41
Weighing pan support 42
Bottom plate 11
Housing 12
Through hole 121
Mounting portion 51
Support plate 52
Air channel hole 53
Protrusion 54
First gap channel b
First airflow channel A
Flow channel a
First mounting portion 511
Second mounting portion 512
Second gap channel c
Third gap channel d
Second airflow channel B
Outer cylindrical ring 61
Inner cylindrical ring 62
Annular plate 63
Upper cavity 64
Lower cavity 65
Anti-overflow protection hole 611
Heat-insulation plate 70

What is claimed is:

1. An integrated high-precision weighing module, comprising:
    a shell comprising a housing having an upper end surface provided with a through hole;
    an electromagnetic force sensor, mounted in the shell, with a bearing head of the electromagnetic force sensor that extends upward from an upper end portion of the shell through the through hole;
    a printed circuit board (PCB), mounted in the shell;
    a weighing pan component, mounted on the bearing head;
    a support ring that is sheathed over the bearing head and is located between the weighing head component and the shell, the support ring comprising a support plate and a mounting portion that is disposed on the support plate, wherein the support ring is sheathed over the bearing head, in a clearance fit, by means of the mounting portion; and
    an air baffle ring, located on the support ring and disposed around the weighing pan component;
    wherein a first airflow channel is formed among the shell, the support ring, and the air baffle ring, such that at least a part of the airflow in the shell flows to the outside though the first airflow channel when the integrated high-precision weighing module is powered on;
    wherein the support plate is provided with a plurality of air channel holes that surround the mounting portion and are in communication with the through hole, a protrusion that extends upward is arranged in a circle at a periphery of the air channel holes, such that a flow channel is formed between the protrusion and the mounting portion; and
    wherein a lower portion of the air baffle ring is in clearance-fit with an upper portion of the support ring to form a first gap channel, and the first airflow channel is formed by the flow channel being in communication with the first gap channel.

2. The weighing module of claim 1, wherein the weighing pan component comprises a weighing pan support that is mounted on the bearing head, with a weighing pan mounted on the weighing pan support.

3. The weighing module of claim 2, wherein:
    the shell comprises a bottom plate; and
    the electromagnetic force sensor and the PCB are mounted on the bottom plate, and the housing, which is connected to the bottom plate, covers the exterior of the electromagnetic force sensor and the PCB.

4. The weighing module of claim 1, wherein each air channel hole is a slotted hole.

5. The weighing module of claim 1, wherein the mounting portion comprises:
    a first mounting portion, located outside the housing, that extends upward along the support plate; and
    a second mounting portion, located inside the housing, that extends downward along the support plate, wherein an outer diameter of the first mounting portion is greater than an outer diameter of the second mounting portion.

6. The weighing module of claim 5, wherein:
a second gap channel is formed between the mounting portion and the bearing head;
the air baffle ring is sheathed over the first mounting portion;
a third gap channel is formed between the air baffle ring and the weighing pan component; and
the second gap channel is in communication with the third gap channel to form a second airflow channel.

7. The weighing module of claim 6, wherein the air baffle ring comprises:
an outer cylindrical ring;
an inner cylindrical ring, arranged concentrically with the outer cylindrical ring; and
an annular plate that connects the inner and outer cylindrical rings, such that an upper cavity and a lower cavity are formed between the inner and outer cylindrical rings, with the first gap channel located in the lower cavity.

8. The weighing module of claim 7, wherein an outer end portion of the weighing pan is at least partially located in the upper cavity.

9. The weighing module of claim 7, further comprising:
a plurality of anti-overflow protection holes, located at the lower cavity of the outer cylindrical ring.

10. The weighing module of claim 3, further comprising:
a heat-insulation plate, provided to isolate the electromagnetic force sensor and the PCB in two independent spaces.

* * * * *

UNITED STATES PATENT AND TRADEMARK OFFICE
CERTIFICATE OF CORRECTION

PATENT NO. : 11,733,084 B2
APPLICATION NO. : 17/302655
DATED : August 22, 2023
INVENTOR(S) : Huang et al.

Page 1 of 1

It is certified that error appears in the above-identified patent and that said Letters Patent is hereby corrected as shown below:

On the Title Page

Item (56) References Cited, U.S. Patent Documents, please delete "2017/0122797 A1* 5/2017 Bhler ................ F25B 21/02" and insert -- 2017/0122797 A1* 5/2017 Bühler et al. ................ F25B21/02 --.

Signed and Sealed this
Tenth Day of October, 2023

Katherine Kelly Vidal
*Director of the United States Patent and Trademark Office*